United States Patent [19]
Mueller et al.

[11] Patent Number: 6,041,748
[45] Date of Patent: Mar. 28, 2000

[54] PIPE MODULE

[75] Inventors: Heinz Mueller, Remseck; Klaus Waltenberg, Murr, both of Germany

[73] Assignee: Filterwerk Mann & Hummel GmbH, Ludwigsburg, Germany

[21] Appl. No.: 08/981,536

[22] PCT Filed: May 14, 1996

[86] PCT No.: PCT/EP96/02069

§ 371 Date: Apr. 4, 1998

§ 102(e) Date: Apr. 4, 1998

[87] PCT Pub. No.: WO96/41944

PCT Pub. Date: Dec. 27, 1996

[30] Foreign Application Priority Data

Jun. 13, 1995 [DE] Germany ............ 195 21 025

[51] Int. Cl.[7] .................................................. F02M 35/12
[52] U.S. Cl. .............................. 123/184.21; 123/184.53; 123/184.57; 123/184.61
[58] Field of Search .................. 123/184.53, 184.57, 123/184.61, 184.21; 181/240

[56] References Cited

U.S. PATENT DOCUMENTS

| | | |
|---|---|---|
| 3,177,854 | 4/1965 | Garcea ........................ 123/184.38 |
| 4,183,332 | 1/1980 | Hofbaüer et al. ............ 123/184.42 |
| 4,602,607 | 7/1986 | Balsley ............................ 123/574 |
| 4,643,138 | 2/1987 | Ruf et al. .................... 123/184.34 |
| 4,819,588 | 4/1989 | Itoh et al. ................... 123/184.42 |
| 4,898,125 | 2/1990 | Ampferer .................... 123/184.21 |
| 4,907,547 | 3/1990 | Daly ............................ 123/184.53 |
| 4,970,994 | 11/1990 | Sawada et al. .............. 123/184.35 |
| 5,003,933 | 4/1991 | Rush, II et al. ............ 123/184.42 |
| 5,116,231 | 5/1992 | Oki et al. .................... 123/184.57 |
| 5,125,369 | 6/1992 | Hitomi et al. ............... 123/184.36 |
| 5,150,669 | 9/1992 | Rush, II et al. ............ 123/184.42 |
| 5,259,356 | 11/1993 | Karlsson et al. ............... 123/541 |
| 5,357,931 | 10/1994 | Semence ........................ 123/456 |
| 5,465,699 | 11/1995 | Voigt ............................. 123/470 |
| 5,477,819 | 12/1995 | Kopec .......................... 123/184.42 |
| 5,636,605 | 6/1997 | Nomizo et al. ............. 123/184.61 |
| 5,653,200 | 8/1997 | Hafner et al. ............... 123/184.21 |
| 5,664,533 | 9/1997 | Nakayama et al. .......... 123/184.42 |
| 5,715,782 | 2/1998 | Elder ........................... 123/184.61 |
| 5,816,213 | 10/1998 | Gaviani et al. ............... 123/198 E |
| 5,826,553 | 10/1998 | Nakayama et al. .......... 123/184.42 |

*Primary Examiner*—Willis R. Wolfe
*Assistant Examiner*—Hai Huynh
*Attorney, Agent, or Firm*—Evenson, McKeown, Edwards & Lenahan, P.L.L.C.

[57] ABSTRACT

A pipe module, especially in the inlet system of an internal combustion engine, having at least one curved pipe (1) with at least one functional component (2, 5, 6, 7) substantially in the curved region and especially inside it.

4 Claims, 5 Drawing Sheets

PIPE MODULE

The invention relates to a pipe module, especially in the intake system of an internal combustion engine, with the pipe module having at least one curved pipe.

Pipe modules of this kind are known for example from DE-OS 44 18 001.

The disadvantage of this known pipe module is that so far the space located inside the curvature of the pipe has been insufficiently utilized.

It is also known that oil can be deposited in the vicinity of the crankcase. A bypass resonator is known from DE-OS 43 36112. An energy strip is also known from DE-OS 4116 326. Hence the goal of the invention is to improve a pipe module of the species recited at the outset in such fashion that a compact space-saving, less expensive pipe module that is easy to mount is provided.

This goal is achieved according to the invention by virtue of the fact that at least one functional element is located essentially in the curved area, especially inside the latter.

In this manner, a compact and space-saving design is obtained, manufacturing time is saved, and weight savings are achieved overall in the engine compartment because functional elements at other points, together with the connecting lines, are eliminated. In this manner, the number of tools necessary can also be reduced, with a corresponding variety of variations.

One advantageous improvement on the invention provides that the functional element is a damping volume. By providing the functional element directly in the vicinity of the area where it produces its effect, connecting pathways required for a solution that is remote from the location are eliminated. This produces an efficient usage of material, and flow losses are reduced for example.

In another advantageous improvement on the invention, provision is made such that the functional element is an oil separator, especially for venting the crankcase. By locating the functional element in the area where the crankcase gases escape, short paths result that lead to an efficient usage of materials and compact structures.

According to the invention, provision is made in another embodiment such that the functional element is a bypass resonator. By locating the functional element directly in the vicinity of the area where it operates, connecting paths required for a solution remote from such a location are eliminated. This leads to an efficient usage of material, compact elements result, and flow losses are also reduced for example.

In one advantageous embodiment of the invention, provision is made such that the functional element is a throttle valve. By locating the functional element directly in the vicinity of the area where it operates, connecting pathways that are required for solutions remote from the area of operation are limited. This results in an efficient usage of material, compact elements are obtained, and flow losses are reduced as well for example.

In another improvement according to the invention, provision is made such that the pipe module is made of plastic and/or metal. Both materials exhibit advantageous properties as far as the stresses in the application are concerned and are also very variable in the way that they are processed. Both materials can be worked by casting for example, which is advantageous for mass production.

Another advantageous improvement on the invention provides that the pipe module has two, three, four, five, six, eight, ten, or twelve pipes. This modular application of the invention provides cost advantages in mass production.

An improvement on the invention according to the invention provides that the functional elements communicate with the internal combustion engine through connections. The fact that the functional elements, depending on their applications, communicate with the internal combustion engine in the manner according to the invention means that compact dimensions as well as flow-favorable relationships are created, saving space and expense. The total weight is reduced and so is consumption.

Another improvement according to the invention provides that the functional elements are integrated in the pipe module housing. By integrating the functional elements into the housing of the pipe module, housing walls and communicating pathways can be advantageously eliminated for example, and consequently weight and expense can be reduced as well. The pipe module becomes even more compact, lightweight, and inexpensive as a result.

Provision is made in one improvement according to the invention such that the functional element is an injection valve. In addition to the result that the pipe module becomes even more compact, another advantage consists in the fact that the problem of contamination of the injection valves no longer arises and neither do the resultant problems.

In another improvement on the invention, provision is made such that the functional element is an energy strip or an electrical regulating unit. By integrating the entire control and/or regulating device of the injection system into the pipe module, the pipe module becomes much more compact, lightweight, and inexpensive.

Another improvement according to the invention provides that the functional elements are suspended elastically and free of vibration. The advantage of this type of mounting consists in low noise and safe operation as far as the question of the strength of the parts is concerned.

Advantageous improvements on the invention follow from the subclaims.

These and other features of preferred improvements on the invention follow from the specification and the drawings as well as the claims, with the individual features being implemented alone or together in the form of subcombinations in the embodiment of the invention and in other areas, and can be advantageous for designs that can be protected in themselves, for which protection is hereby claimed. Embodiments of the invention are shown in the drawings and will be explained in greater detail below.

Figure 1:
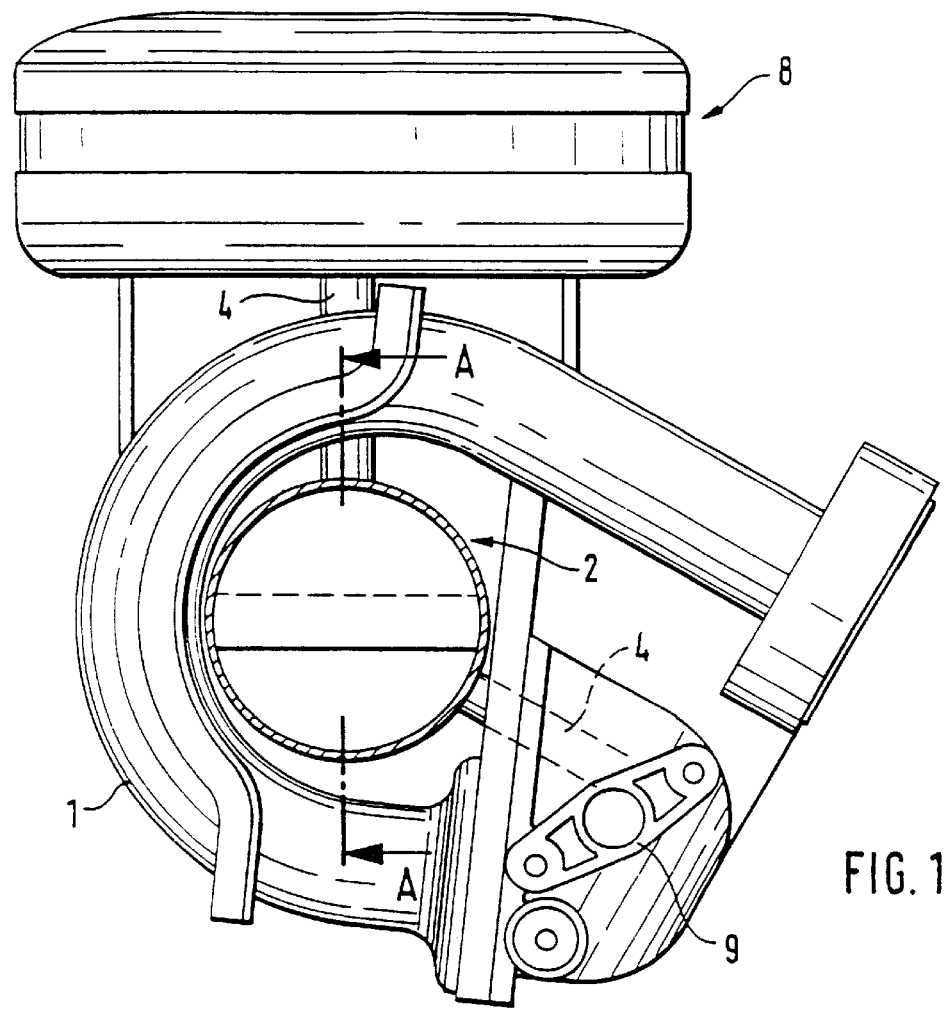
FIG. 1 shows a side view of a pipe module.

FIG. 1 shows a pipe module with an oil separator located inside its inner area of curvature. This oil separator, in this embodiment, is a functional element that communicates by means of connections 4 with the crankcase ventilation, not shown, and the air filter housing 8. In addition, the pipe module has a connection 9 for recycling exhaust.

Figure 2:
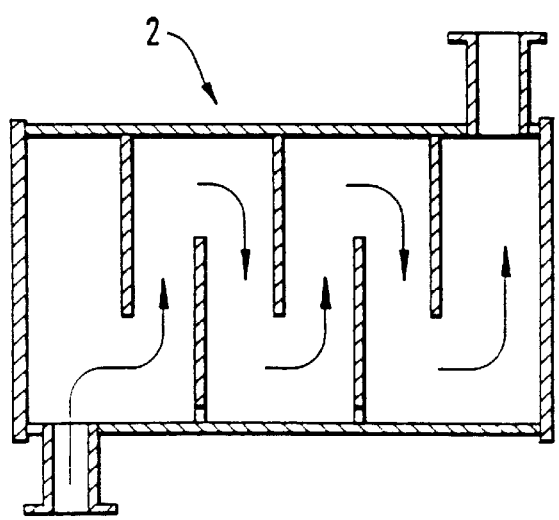
FIG. 2 is a section through the oil separator in FIG. 1.

FIG. 2 shows the oil separator in FIG. 1 in a sectional view. The arrows in FIG. 2 indicate the direction of flow of the gas passing through.

Figure 3:
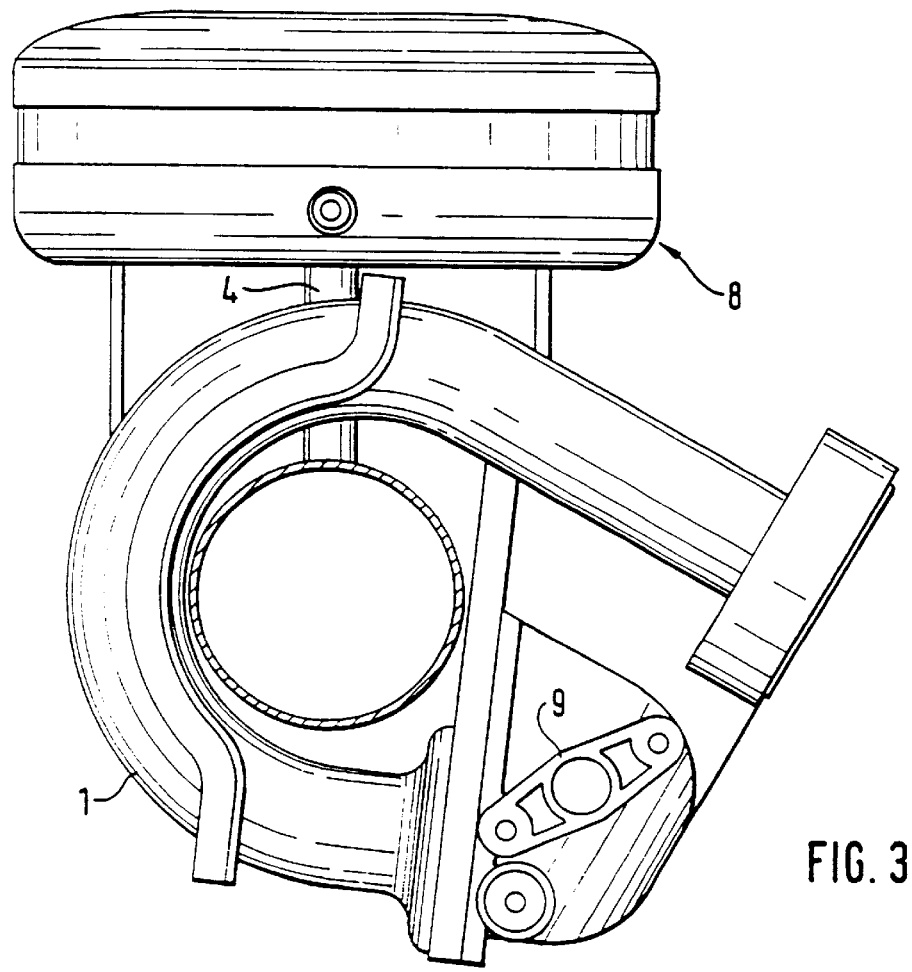
FIG. 3 is a side view of a pipe module with a bypass resonator.

A pipe module is shown in FIG. 3, said module having a bypass resonator 7 in the internal area of the curved tube or tubes 1. This bypass resonator 7 communicates with the internal combustion engine through a connecting line 4 and air filter housing 8.

Figure 4:
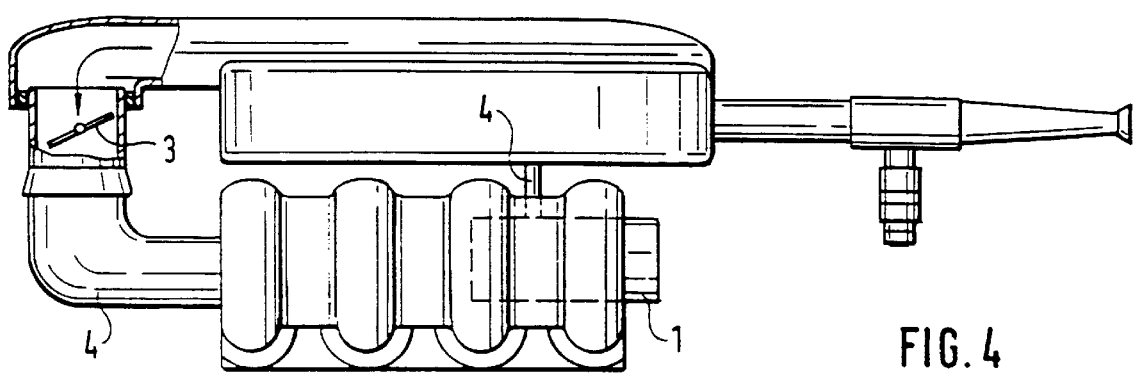
FIG. 4 is a front view of a pipe module.

The arrangement of various functional elements such as those of throttle valve 3 and bypass resonator 7 is shown in FIG. 4. These functional elements communicate by connections 4 with the engine.

Figure 5:
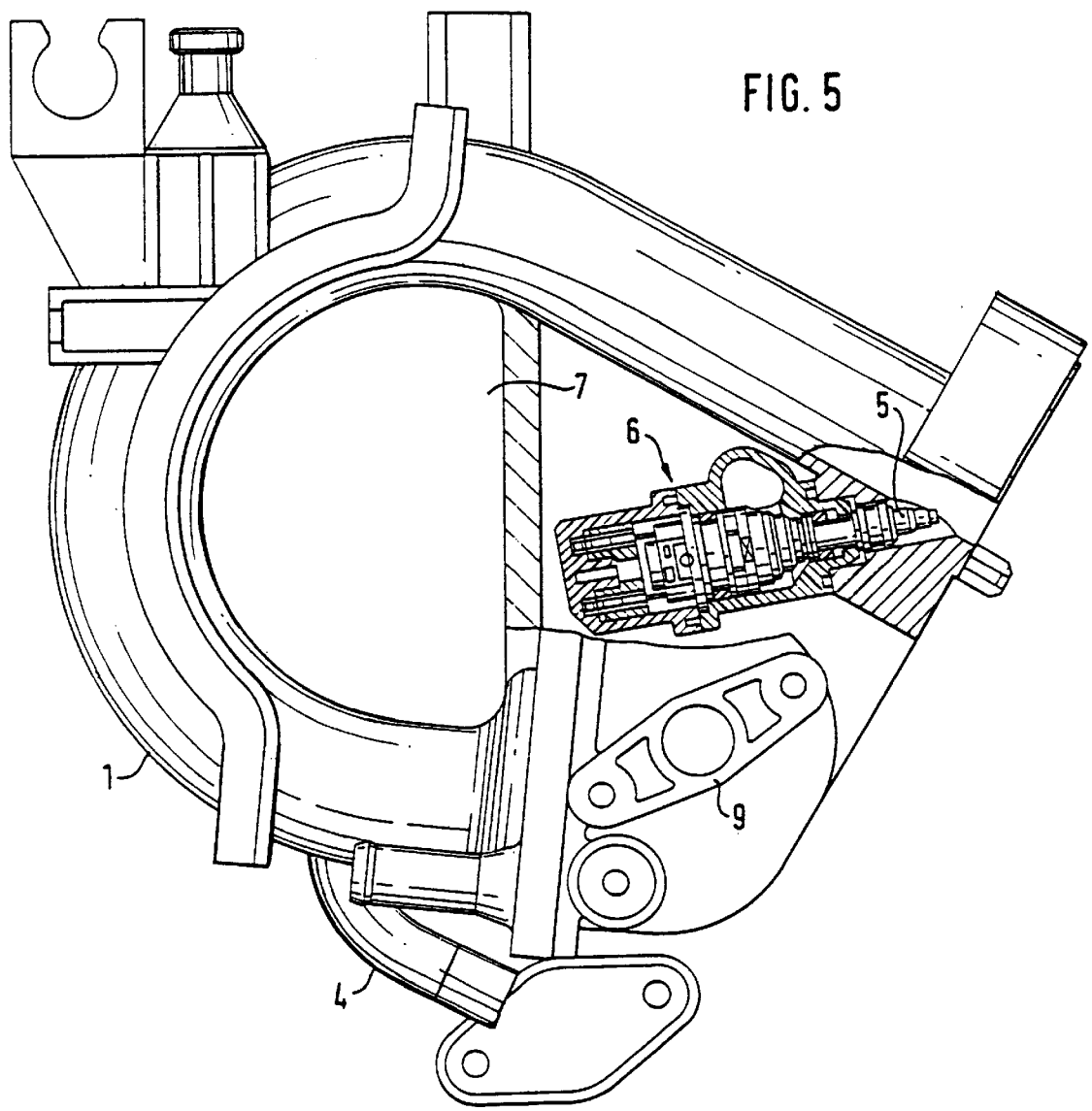
FIG. 5 is a side view of a pipe module with an injection nozzle, energy strip, and bypass resonator.

FIG. 5 shows the arrangement of the functional elements, injection valve 5, and an energy strip 6 with an integrated injection valve 5 and bypass resonator 7 inside the curved area of the pipe module. This embodiment also uses connections 4 that are necessary for communication with the engine and a connection to exhaust return 9.

Figure 6:
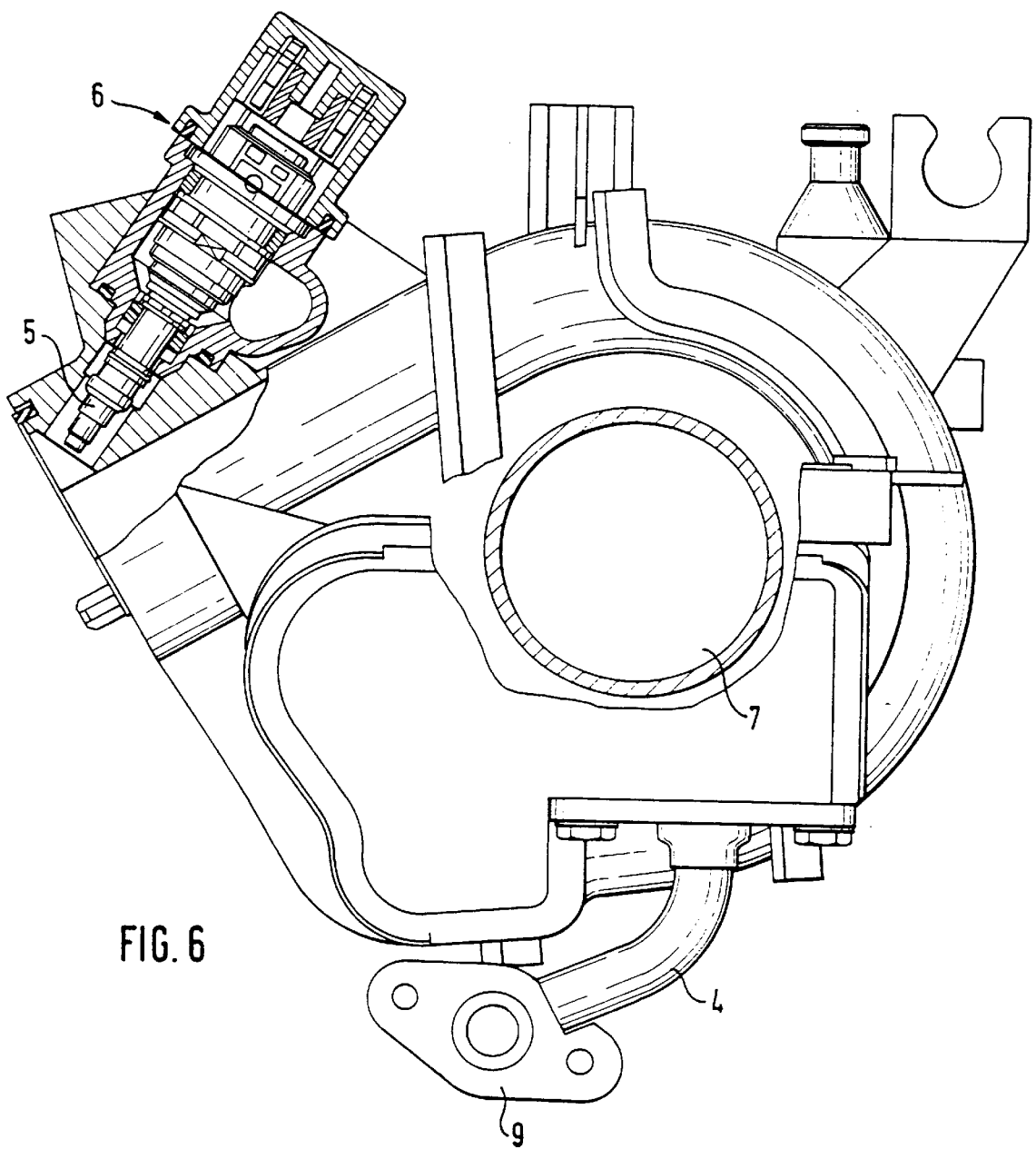
FIG. 6 is a side view of a pipe module as in FIG. 5 but with the injection nozzle and energy strip located outside.

In a modification of FIG. 5, FIG. 6 shows the arrangement of injection valve 5 and energy strip 6 on the outside of the curved area of the pipe module.

Figure 7:
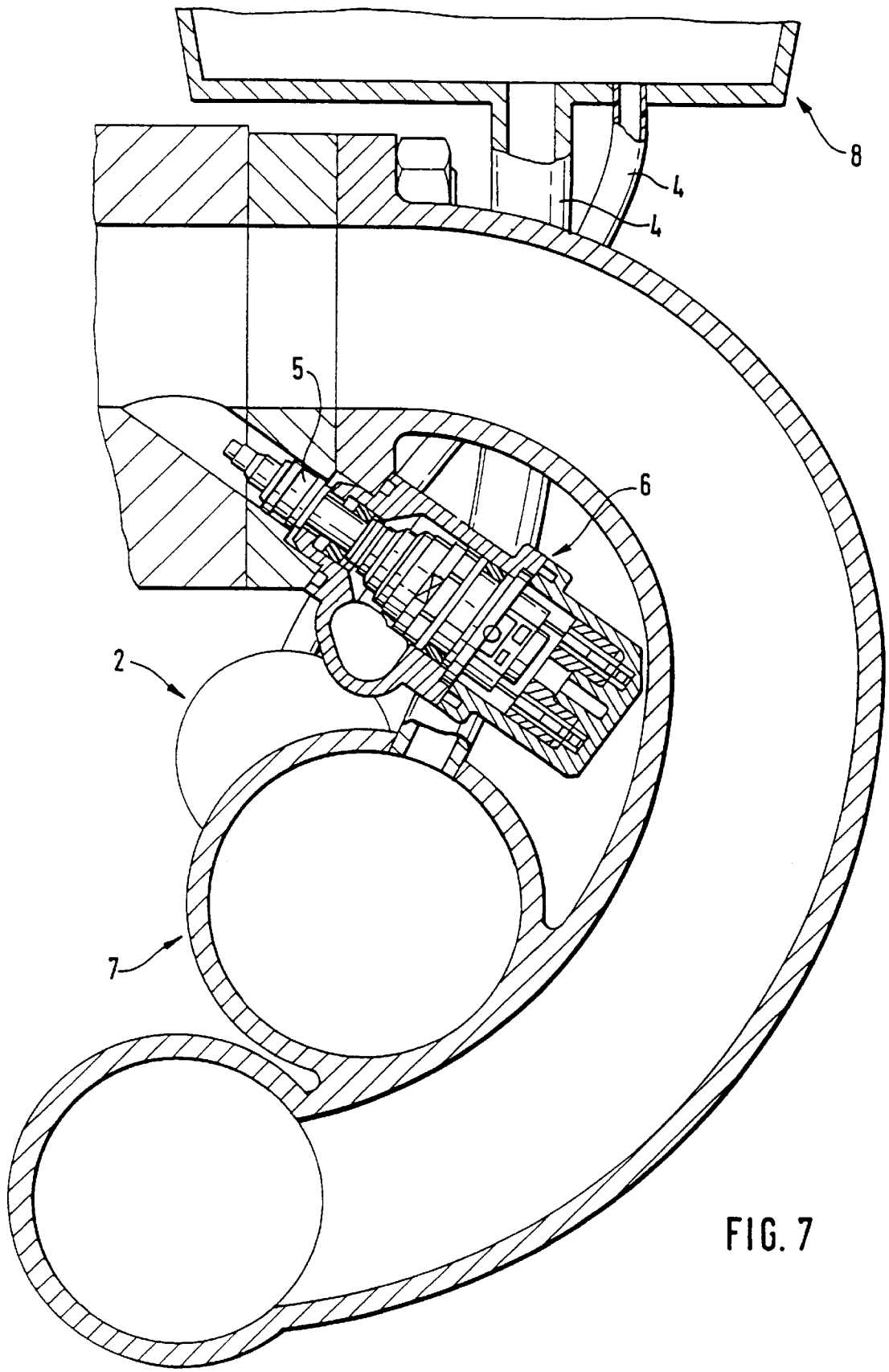
FIG. 7 is a side view of a pipe module with an oil separator, bypass resonator, injection nozzle, and energy strip.

FIG. 7 shows the compact arrangement of all of the functional elements mentioned above. Injection valve 5, energy strip 6, bypass resonator 7, and oil separator 2 are located in the curved area, especially inside the latter. Communication between the functional elements is via connections 4.

We claim:

1. Pipe module in an intake tract of an internal combustion engine, the pipe module having between 2 and 6 curved pipes, wherein a functional element operating as a dampening volume is disposed in a curvature area of the curved pipes and further wherein the functional element is a bypass resonator.

2. Pipe module according to claim 1, wherein the functional element is integrated into the pipe module housing.

3. Pipe module according to claim 1, wherein an additional function element, an injection valve, is provided within the curve area of the pipes.

4. Pipe module according to claim 1, wherein the functional element is suspended resiliently and free of vibration.

* * * * *